Figure 1:
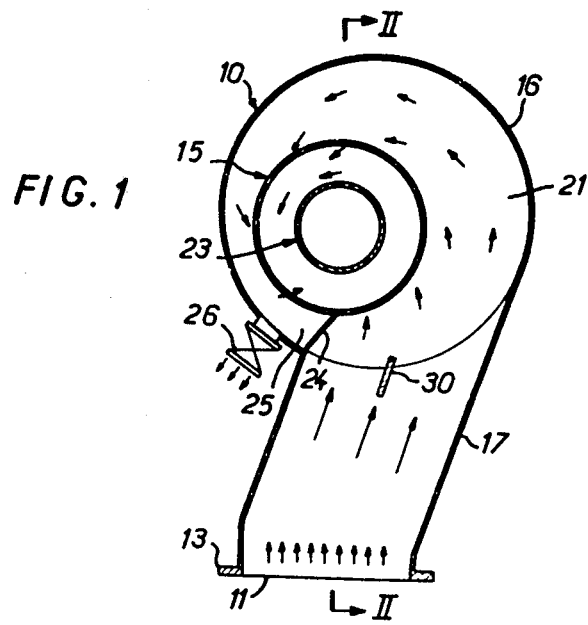

United States Patent [19]

Jackson

[11] 4,276,171

[45] Jun. 30, 1981

[54] WATER FILTER HAVING SPIRAL CASING

[75] Inventor: Philip Jackson, Paris, France

[73] Assignee: E. Beaudrey & Cie, Paris, France

[21] Appl. No.: 806,929

[22] Filed: Jun. 15, 1977

[30] Foreign Application Priority Data

Jun. 22, 1976 [FR] France ............................. 76 18883

[51] Int. Cl.³ .......................................... B01D 29/04
[52] U.S. Cl. .................................... 210/437; 210/456;
210/497.01
[58] Field of Search ............... 210/407, 437, 441, 455,
210/456, 457, 497 R; 55/457, 459 R, 459 A, 459
B, 459 C, 459 D

[56] References Cited

U.S. PATENT DOCUMENTS

| 2,661,845 | 12/1953 | Sullivan ............................. 210/448 |
| 3,421,291 | 1/1969 | Messen-Jaschin ............. 55/459 B X |
| 3,572,011 | 3/1971 | Wilhelmsson ................. 55/459 B X |
| 3,792,573 | 2/1974 | Borsheim ........................... 55/457 X |
| 3,853,512 | 12/1974 | Hayashi ........................ 55/459 B X |

FOREIGN PATENT DOCUMENTS

| 831430 | 3/1960 | United Kingdom . |
| 945098 | 12/1963 | United Kingdom . |
| 979846 | 1/1965 | United Kingdom . |
| 1211765 | 11/1970 | United Kingdom . |
| 1263461 | 2/1972 | United Kingdom . |
| 1297425 | 11/1972 | United Kingdom . |
| 1340954 | 12/1973 | United Kingdom . |
| 1343696 | 1/1974 | United Kingdom . |
| 1430872 | 4/1976 | United Kingdom . |

Primary Examiner—William A. Cuchlinski, Jr.
Attorney, Agent, or Firm—Perry Carvellas

[57] ABSTRACT

A filter for filtering water, e.g. seawater, for industrial use, in condensers for steam turbines, for example, comprising a spiral housing having a strainer or filter member and having an inlet inclined with respect to the housing and an outlet generally in alignment with the strainer or filter member which is preferably cylindrical. The inlet and spiral shaped housing combine to provide a sweeping water flow pattern along the periphery of the strainer or filter member. A partition is disposed parallel to the axis of the strainer or filter member between the strainer or filter member and the spiral housing, remote from the inlet relative to the flow of water around the strainer or filter member. Solids are collected in an area defined by the partition and parts of the strainer or filter member and spiral housing immediately upstream thereof. Solids may be continuously or intermittently discharged from the solids collecting area.

5 Claims, 2 Drawing Figures

U.S. Patent

Jun. 30, 1981

4,276,171

WATER FILTER HAVING SPIRAL CASING

The present invention relates generally to filtering water for industrial use, and more particularly, though not exclusively, to filtering the flow of water at very high flow rates for cooling equipment for machines, for example, condensers for steam turbines.

As a rule such water is preliminarily filtered by a screen or filter.

It frequently happens that in certain machines, particularly those using seawater, small-sized living organisms transported by the water avoid the screen through which the water is carried and later develop downstream of the corresponding screen until they eventually clog the conduits supplied.

For instance mussels are frequently noticed developing just upstream of the condensers. To overcome this drawback it has been proposed to install filters in the affected conduits. In certain known filters of this type the strainer or filter member is fixed. To permit cleaning such a fixed filter member may then be reached and/or dismounted. Alternatively, the filter member may be cleaned by countercurrent washing by means of special discharge valve, namely, of the quick opening variety. In both cases such a filter, with a fixed filter member, must be taken out of service during cleaning.

In other present-day filters the cleaning of the filter member is effected automatically by rotating either the filter member or an associated cleaning member provided for this purpose. Yet in such filters when the water to be filtered carries solids or debris, mussels for example, the solids thrust against the surface of the strainer may block the rotatable member, preventing rotation, whether it is filter member itself or an associated cleaning member, at the risk of damaging the rotatable member, or even breaking it or one of the parts of the rotatable assembly associated therewith.

An object of the present invention is the provision of a filter for filtering water for industrial use which overcomes the foregoing drawbacks.

According to the invention there is provided a filter for water for industrial use, comprising a housing having inlet means and outlet means and a strainer or filter member operatively interposed therebetween, said housing having a spiral wall spaced outwardly from said strainer or filter member and generally parallel to the axis thereof, said inlet and said spiral wall combining to provide a sweeping water flow pattern along the periphery of the strainer or filter member.

According to another aspect of the invention there is provided a self-cleaning filter for solids entrained in water for industrial use, comprising a housing having inlet means and outlet means and a strainer or filter member disposed operatively therebetween, said housing being of spiral configuration so as to define a water flow pattern sweeping along the periphery of said strainer or filter member, and partition means remote from said inlet means relative to the direction of flow of water in said housing and fitted between said spiral housing and said strainer or filter member for preventing solids from circulating entirely around the periphery of said strainer or filter member back to said inlet means, and discharge means for solids collected in an area upstream of said partition means between said strainer or filter member and said spiral housing.

The particular configuration of the inlet means and the spiral wall disposed thereafter relative to the direction of flow of water therein, which are features of the invention, have the effect of giving the flow of water to be filter an peripheral flow pattern about the strainer or filter member, with progressive concomitant convergence thereof, so as to provide, on the one hand, uniform velocity distribution and hence circulation along the entire periphery of the strainer of filter surface, and, on the other hand, the sweeping of this surface and, therefore, entraining of solids and debris which may have been conveyed in the water towards a zone in the filter housing designed to form a solids collecting area.

Thus the cleaning of the strainer or filter member, as well as the elimination of solids or debris which may have been held back by the strainer or filter member, advantageously does not require taking the filter out of operation or the operation of any kind of mechanical means such as deflectors, by-passes or special quick operating valves. Further, straining is particularly efficient, namely as regards mussels which may be carried in the water to be used.

Finally, the loss of head across the filter so constructed is minimal owing to the particular flow pattern of the water to be filtered, already discussed above, and the absence of a fixed or movable deflector device situated in the flow of water.

Figure 2:
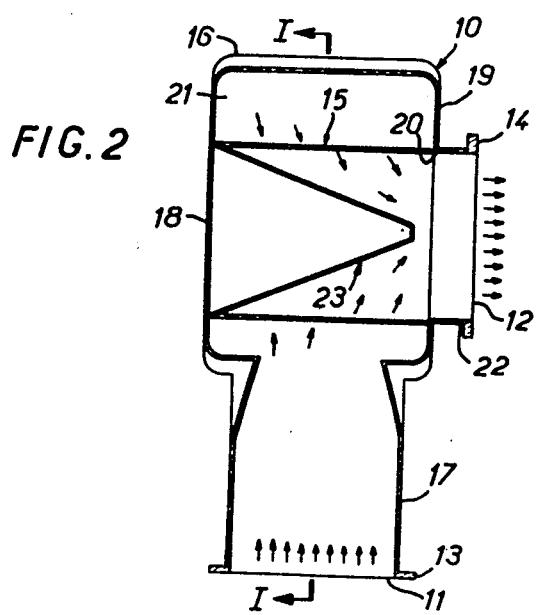

Other features and advantages of the invention will be brought out in following description, given by way of example, with reference to the accompanying schematic drawings, in which:

FIG. 1 is a sectional view of a filter according to the invention taken along the line I—I in FIG. 2; and FIG. 2 is another sectional view of the filter, taken on the line II—II in FIG. 1.

In accordance with the preferred embodiment illustrated in the drawings, the filter for water for industrial use generally comprises a filter housing 10 having an inlet 11 and an outlet 12 respectively bounded by radial flanges 13 and 14 adapted to be connected to pipes, conduits or other means. In the illustrated embodiment the axes of the inlet 11 and outlet 12, and therefore their flanged ends 13 and 14, are at right angles to each other.

In the housing of the filter 10 a fixed strainer or filter member 15 is interposed operatively between the inlet 11 and the outlet 12. The fixed strainer or filter member 15 comprises a cylindrical strainer in the illustrated example. The filter housing 10 in which the strainer or filter member 15 is disposed comprises a spiral or volute wall around the strainer or filter member. Spaced from the strainer or filter member 15 is an inlet conduit 17 which runs from the inlet intersecting and obliquely joining the spiral wall 16, transversely to the axis of the strainer or filter member 15 and at a distance therefrom. Lateral sidewalls 18, 19 are disposed at opposite ends of the strainer or filter member 15, transversely to the axis of the strainer or filter member and joined to the spiral wall 16 enclosing the strainer or filter member 15. The sidewall 18 is continuous along its entire surface whereas the other sidewall 19 has an opening 20 for communicating the interior of the strainer or filter member 15 with the outlet 12 of the filter housing 10. Owing to the spiral or volute configuration of the wall 16 of the filter housing 10, the strainer or filter member is eccentrically located inside the supply chamber 21 formed by the wall 16 thereabout.

In practice, and as illustrated, the strainer or filter member 15 extends continuously from one sidewall to the other, perpendicular thereto, and the opening 20 in the sidewall 19 has a diameter equal to that of the strainer or filter member. The sidewall 19 carries an outwardly projecting outlet conduit 22 which, as a continuation of the strainer or filter member 15 along its axis, thereby connects the interior of the latter to the outlet 12 of the filter housing 10.

In the illustrated embodiment, a conical deflector 23 is disposed in the volume defined inside and coaxially to strainer or filter member 15 and is borne by the sidewall 18 at its flared end and has its tapered end near the outlet 12 of the filter housing 10.

Further, in the illustrated embodiment, the spiral wall 16 of the filter housing 10 forms, in conjunction with the retaining wall 24 inside the filter housing 10 and in alignment with a generatrix of the strainer or filter member 15 which is circumferentially most remote from the inlet 11 of the filter housing 10, a solids collecting area 25 which is adapted to communicate with the exterior through a solids discharge orifice controlled by an ordinary valve or tap 26.

In the illustrated embodiment the retaining partition 24 transversely from the corresponding end of the spiral wall 16 of the filter housing 10 to the strainer or filter member 15 and is substantially in contact with the strainer or filter member along a corresponding generatrix thereof.

Furthermore, one or more guiding vanes 30 may be disposed transversely in the tubular inlet conduit 17, as shown.

As depicted by arrows in FIGS. 1 and 2, the flow of water entering the filter housing 10 is directed by the shape of the spiral wall 16 together with the angle of tubular inlet 17 with respect to the spiral wall 16, to follow a flow path around the strainer or filter member 15 which, bearing in mind the configuration of the strainer or filter member and its eccentricity inside the supply chamber surrounding the spiral wall 16, causes the flow of water to sweep along the surface of the strainer or filter member and pass therethrough into the interior of the strainer or filter member and then to be deviated by the conical deflector 23 towards the outlet 12 of the filter housing.

The solids collecting area 25 which is located in the filter housing at the extreme opposite end of the water flow path from the inlet 11 gradually collects solids which are conveyed by the flow of water entering the filter housing 10 and entrained around the strainer or filter member 15 by the current of water sweeping along its periphery.

The valve 26 permits the discharge of solids from the filter housing. This discharge may be effected intermittently, i.e. discontinuously by operating the valve 26 at predetermined intervals.

Alternatively, the solids collected inside the filter housing may be effected continuously whereby the valve 26 allows a small continuous flow of cleaning water adapted to effect the discharge.

The present invention is, moreover, not restricted to the above described and illustrated embodiment but encompasses all structural modifications within the scope of the appending claims.

Nonetheless the simplicity of the preferred embodiment will be appreciated in which the various constituent parts may be easily assembled by bolting or welding, in accordance with the usual techniques.

What I claim is:

1. A self-cleaning filter for filtering solids entrained in water for industrial use, comprising a housing having inlet means and outlet means and a strainer or filter member disposed operatively therebetween said housing being of spiral configuratin so as to define a water flow pattern sweeping along the periphery of said strainer or filter member and wall means remote from said inlet means relative to the direction of flow of water defined by said spiral housing and fitted between said spiral housing and said strainer or filter member for preventing solids from circulating entirely around the periphery of said strainer or filter member back to said inlet means, a solids collecting area upstream of said wall means between said strainer or filter member and said spiral housing, and discharge means for discharging solids collected in said solids collecting area.

2. A water filter for industrial use, comprising a housing having inlet means and outlet means and a normally stationary strainer or filter member operatively interposed therebetween, said housing have a spiral wall space outwardly from said strainer or filter member and generally parallel to the axis thereof, said inlet means and said spiral wall combining to provide a sweeping water flow pattern along the periphery of the strainer or filter member, a solids collecting area disposed inside said housing and defined by part of said strainer or filter member, part of said spiral wall facing said part of said strainer or filter member and a partition extending between said spiral wall and said strainer or filter member parallel to the axis of the filter member, and means for discharging solids collected in said solids collecting area from said housing.

3. A filter according to claim 2, wherein the axis of said outlet means is generally in axial alignment with said strainer or filter member, and the axis of said inlet means is disposed in a plane perpendicular to axis of said strainer or filter member.

4. A filter according to claim 2, wherein said partition extends transversely between said spiral wall of said housing and said strainer or filter member.

5. A filter according to claim 2, wherein said solids collecting area is disposed circumferentially remote from said inlet means relative to the direction of flow of water therein.

* * * * *